United States Patent Office 2,846,456
Patented Aug. 5, 1958

2,846,456

STEROID 21-ALDEHYDES

Lewis H. Sarett, Princeton, N. J., assignor to Merck & Co., Inc., Rahway, N. J., a corporation of New Jersey No Drawing. Application February 11, 1955
Serial No. 487,714

15 Claims. (Cl. 260—397.45)

This invention is concerned generally with novel steroid compounds and with processes of preparing the same. More particularly, it relates to 21-aldehyde derivatives of $\Delta^{1,4}$-3,11,20-triketo-17$\alpha$,21-dihydroxy-pregnadiene and related compounds, and the process of making these $\Delta^{1,4}$-3,20 - diketo - 11 - oxygenated - 17 - hydroxy-pregnadiene 21-aldehyde compounds. These new aldehydes possess cortisone-activity, but differ from cortisone in being substantially free of undesired side effects such as sodium or water-retention action.

These novel $\Delta^{1,4}$-3,20 - diketo - 11 - oxygenated - 17-hydroxy-pregnadiene 21-aldehyde compounds, subject of the present invention, may be chemically represented as follows:

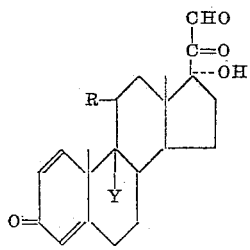

wherein R is a keto or hydroxy radical, and Y is a hydrogen or halogen substituent.

These novel $\Delta^{1,4}$-3,20-diketo-11-oxygenated-17-hydroxy-pregnadiene 21-aldehyde compounds may be prepared by reacting a $\Delta^{1,4}$-3,20-diketo-11-oxygenated-17-hydroxy-pregnadiene compound containing a free 21-alcohol grouping with cupric acetate thereby oxidizing said 21-alcohol grouping to an aldehyde to produce the retrocortin 21-aldehyde compound.

The $\Delta^{1,4}$-3,20-diketo-11-oxygenated-17-hydroxy-pregnadiene compounds having a free 21-alcohol grouping which are ordinarily employed as starting materials in the hereinabove-mentioned procedure include $\Delta^{1,4}$-3,11,20-triketo - 17$\alpha$,21 - dihydroxy - pregnadiene, $\Delta^{1,4}$ - 3,20-diketo - 11$\beta$,17$\alpha$,21 - trihydroxy - pregnadiene, $\Delta^{1,4}$ - 9 - halo-3,11,20-triketo - 17$\alpha$,21 - dihydroxy-pregnadiene such as $\Delta^{1,4}$-9$\alpha$-fluoro-3,11,20-triketo-17$\alpha$,21-dihydroxy-pregnadiene, $\Delta^{1,4}$-9$\alpha$-chloro-3,11,20-triketo - 17$\alpha$,21 - dihydroxy-pregnadiene, $\Delta^{1,4}$-9-halo-3,20 - diketo - 11$\beta$,17$\alpha$,21 - trihydroxy - pregnadiene compounds such as $\Delta^{1,4}$ - 9$\alpha$ - chloro-3,20 - diketo - 11$\beta$,17$\alpha$,21 - trihydroxy - pregnadiene, $\Delta^{1,4}$-9$\alpha$-fluoro - 3,20 - diketo - 11$\beta$,17$\alpha$,21 - trihydroxy-pregnadiene, and the like. The reaction between these $\Delta^{1,4}$ - 3,20 - diketo - 11 - oxygenated - 17 - hydroxy-pregnadiene 21 - free alcohol compounds and the cupric acetate is conveniently conducted by reacting one equivalent of the $\Delta^{1,4}$ - 3,20 - diketo - 11 - oxygenated - 17 - hydroxy-pregnadiene 21-alcohol compound with about two equivalents of the cupric acetate, since the use of a slight excess of the latter, i. e. about 2.1 to 2.2 equivalents thereof, results in the obtainment of maximal yields of the $\Delta^{1,4}$ - 3,20 - diketo - 11 - oxygenated - 17 - hydroxy - pregnadiene 21-aldehyde compounds. The reaction between the cupric acetate and the retrocortin 21-alcohol compound is ordinarily carried out by bringing the reactants together in a polar solvent as for example water, lower alkanols, lower dialkyl ketones, dioxane, tetrahydrofuran, and the like. Since maximum yields are usually secured when the reaction is formed at an acid pH, it is preferred to add a small amount of an acid such as acetic acid to the reaction mixture. The reaction may be carried out at room temperature but it is preferred to conduct the oxidation at the reflux temperature of the solvent mixture employed; when methanol is used as the solvent, and the reaction is carried out under reflux, the reaction is ordinarily complete within an hour. The $\Delta^{1,4}$-3,20-diketo-11-oxygenated-17-hydroxy-pregnadiene 21-aldehyde compound is ordinarily recovered by filtering the reaction mixture to remove by-product cuprous oxide and adding water to the filtered solution, whereupon the $\Delta^{1,4}$-3,20-diketo-11-oxygenated-17-hydroxy-pregnadiene 21-aldehyde compound precipitates, and is recovered by filtration.

The $\Delta^{1,4}$-3,20-diketo-11-oxygenated-17-hydroxy-pregnadiene 21-aldehyde compounds obtained in accordance with this procedure include $\Delta^{1,4}$-3,11,20-triketo-17$\alpha$-hydroxy-pregnadiene 21-aldehyde, $\Delta^{1,4}$-3,20-diketo-11$\beta$,17$\alpha$-dihydroxy-pregnadiene 21-aldehyde, $\Delta^{1,4}$-9-halo-3,11,20-triketo-17$\alpha$-hydroxy-pregnadiene 21-aldehyde, $\Delta^{1,4}$-9$\alpha$-fluoro-3,11,20-triketo-17$\alpha$-hydroxy-pregnadiene 21-aldehyde, $\Delta^{1,4}$-9$\alpha$-chloro-3,11,20-triketo-17$\alpha$-hydroxy-pregnadiene 21-aldehyde, $\Delta^{1,4}$-9-halo-3,20-diketo-11$\beta$,17$\alpha$-dihydroxy-pregnadiene 21-aldehyde, $\Delta^{1,4}$-9$\alpha$ - fluoro - 3,20 - diketo-11$\beta$,17$\alpha$-dihydroxy-pregnadiene 21-aldehyde, $\Delta^{1,4}$-9$\alpha$-chloro-3,20-diketo - 11$\beta$,17$\alpha$ - dihydroxy-pregnadiene 21-aldehyde, and the like.

The following examples illustrate methods of carrying out the present invention, but it is to be understood that these examples are given for purposes of illustration and not of limitation.

*Example 1*

To a solution of 200 mg. of $\Delta^{1,4}$-3,11,20-triketo-17,21-dihydroxy-pregnadiene in 10 ml. of methanol containing 3 drops of glacial acetic acid is added a solution of 240 mg. of cupric acetate hydrate in 30 ml. of methanol. The resulting mixture is heated under reflux for a period of about 45 minutes, and the reaction mixture is filtered thereby removing by-product cuprous oxide formed during the reaction. About 40 ml. of water is added to the filtered methanol reaction solution, and the resulting mixture is evaporated under reduced pressure to a volume of about 10 ml. The crystalline material which separates from the solution is recovered by filtration and dried to give $\Delta^{1,4}$-3,11,20-triketo-17-hydroxy-pregnadiene 21-aldehyde.

The retrocortin utilized as starting material in this example can be prepared as follows: a solution containing 39.6 g. of bromine in 300 cc. of acetic acid is added to a solution containing 100 g. of 3,11,20-triketo-17$\alpha$-hydroxy-21-acetoxy-pregnane dissolved in 1500 cc. of acetic acid. When the reaction is substantially complete, the solution is immediately poured into water, and the resulting suspension is extracted with chloroform. The chloroform extract is washed with water, evaporated to dryness, and the residual material crystallized from acetone-ether to give as a substantially pure crystalline product the 4-bromo - 3,11,20 - triketo - 17$\alpha$ - hydroxy - 21 - acetoxy-pregnane.

The mother liquor from this crystallization procedure is dissolved in benzene and chromatographed over acid-washed alumina, and the chromatogram eluted with mixtures of ether and chloroform. The eluate is evaporated to dryness, and the residual crystalline material is recrystallized from ethyl acetate to give 2-bromo-3,11,20-triketo-17$\alpha$-hydroxy 21-acetoxy-pregnane. A solution of 300 mg. of this 2-bromo-3,11,20-triketo-17$\alpha$-hydroxy-21-acetoxy-pregnane in 5 ml. of collidine is heated for one hour under reflux, and the collidine is evaporated in vacuo. The residual material is dissolved in chloroform, and the chloroform extract is washed with dilute aqueous hydrochloric acid, then with water, dried and evaporated in vacuo to dryness. The residual material is recrystallized from ethyl acetate to give substantially pure $\Delta^1$-3,11,20-triketo-17$\alpha$-hydroxy-21-acetoxy-pregnene; M. P. 244–246° C.

Four hundred milligrams of $\Delta^1$-3,11,20-triketo-17$\alpha$-hydroxy-21-acetoxy-pregnene is dissolved in 50 cc. of glacial acetic acid containing three drops of 30% hydrobromic acid in glacial acetic acid, and to the stirred solution is added a solution containing 0.61 ml. bromine (190 mg.) in 5 ml. of glacial acetic acid over a ten minute period. Five minutes after the addition of bromine is completed, the reaction mixture is poured into 400 ml. of ice water, and the aqueous mixture is extracted three times with chloroform. The chloroform extracts are combined, washed with aqueous sodium bicarbonate solution, then with water, dried and evaporated to dryness in vacuo to give $\Delta^1$-4-bromo-3,11,20-triketo-17$\alpha$-hydroxy-21-acetoxy-pregnene.

Five hundred milligrams of $\Delta^1$-4-bromo-3,11,20-triketo-17$\alpha$-hydroxy-21-acetoxy-pregnene is heated under reflux with 10 ml. of collidine for one hour; the reaction mixture is cooled and, with stirring, is treated with 35 ml. of a 2 N aqueous solution of sulfuric acid. The aqueous mixture is extracted three times with chloroform, and the combined chloroform extracts are dried and the chloroform evaporated therefrom in vacuo. The residual material is dissolved in benzene and chromatographed over 15 g. of acid-washed alumina. The chromatogram is eluted with mixtures of ether and chloroform, and the combined eluates are evaporated to dryness. The residual crystalline material is recrystallized from ethyl acetate to give substantially pure $\Delta^{1,4}$-3,11,20-triketo-17$\alpha$-hydroxy-21-acetoxy-pregnadiene; M. P. 226–228° C.

One hundred milligrams of $\Delta^{1,4}$-3,11,20-triketo-17$\alpha$,21-dihydroxy-pregnadiene 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure $\Delta^{1,4}$-3,11,20-triketo-17$\alpha$,21-dihydroxy-pregnadiene; M. P. 207–214° C.

*Example 2*

A solution of 500 mg. of $\Delta^{1,4}$-3,20-diketo-11,17,21-trihydroxy-pregnadiene in 20 ml. of methanol containing 5 drops of glacial acetic acid is mixed with a solution of 540 mg. of cupric acetate hydrate in 50 ml. of methanol. The mixture is heated under reflux for a period of about 45 minutes, and the reaction mixture is filtered thereby removing by-product cuprous oxide formed during the reaction. The filtered solution is diluted with about 50 ml. of water, and the aqueous mixture is evaporated in vacuo to a volume of about 20 ml. The crystalline material which separates from the solution is recovered by filtration and dried to give $\Delta^{1,4}$-3,20-diketo-11,17-dihydroxy-pregnadiene 21-aldehyde.

The $\Delta^{1,4}$-3,20-diketo-11$\beta$,17$\alpha$,21-trihydroxy-pregnadiene employed in the foregoing procedure is prepared, starting with $\Delta^{1,4}$-3,11,20-triketo-17$\alpha$,21-dihydroxy-pregnadiene, as follows: A mixture of 0.5 part of $\Delta^{1,4}$-3,11,20-triketo-17$\alpha$,21-dihydroxy-pregnadiene, 0.5 part of anhydrous sodium acetate, 0.62 part of semicarbazide hydrochloride and 35 parts of 95% ethanol is heated at a temperature of about 70° C. for about three hours. The reaction mixture is evaporated to small volume in vacuo, the concentrated solution is diluted with water, and the insoluble material which precipitates is recovered by filtration, washed with water and dried. The resulting material is purified by recrystallization from alcohol to produce substantially pure $\Delta^{1,4}$-3,11,20-triketo-17$\alpha$,21-dihydroxy-pregnadiene 3,20-bis-semicarbazone. A solution of 0.45 part of $\Delta^{1,4}$-3,11,20-triketo-17$\alpha$,21-dihydroxy-pregnadiene 3,20-bis-semicarbazone, 0.17 part of sodium borohydride, 9 parts of tetrahydrofuran and 3 parts of water is maintained at reflux temperature for approximately one hour. The reaction solution is cooled to about 15° C., and the excess sodium borohydride decomposed by the addition of a solution of 0.27 part of glacial acetic acid in 1.2 parts of water. The tetrahydrofuran is evaporated in vacuo, and the residual material is extracted with ethyl acetate. The extracts are washed with a saturated salt solution, water, 5% aqueous sodium bicarbonate solution and again with water. The extracts are dried and the ethyl acetate evaporated in vacuo to give $\Delta^{1,4}$-3,20-diketo-11$\beta$,17$\alpha$,21-trihydroxy-pregnadiene 3,20-bis-semicarbazone. The $\Delta^{1,4}$-3,20-diketo-11$\beta$,17$\alpha$,21-trihydroxy-pregnadiene 3,20-bis-semicarbazone is mixed with 5 parts of glacial acetic acid, 1.5 parts of water, 0.85 part of sodium acetate, and 0.8 part of 90% pyruvic acid, and the resulting mixture is heated under nitrogen for four hours at about 75° C. The reaction mixture is diluted with 20 parts of water, and the aqueous mixture is evaporated nearly to dryness in vacuo. The residual material is triturated with water and the organic material is extracted with ethyl acetate. The ethyl acetate solution is washed neutral, dried, decolorized, and evaporated to small volume. Upon cooling the resulting concentrate, a crystalline material separates which is recovered by filtration and purified by recrystallization from ethyl acetate to give substantially pure $\Delta^{1,4}$-3,20-diketo-11$\beta$,17$\alpha$,21-trihydroxy-pregnadiene.

*Example 3*

$\Delta^{1,4}$-9$\alpha$-fluoro-3,11,20-triketo-17$\alpha$-hydroxy-pregnadiene 21-aldehyde is prepared utilizing the procedure of Example 1, but using $\Delta^{1,4}$-9$\alpha$-fluoro-3,11,20-triketo-17,21-dihydroxy-pregnadiene as the starting material in place of the retrocortin utilized in Example 1.

The $\Delta^{1,4}$-9$\alpha$-fluoro-3,11,20-triketo-17$\alpha$,21-dihydroxy-pregnadiene used as starting material in this example may be prepared in accordance with the procedure described hereinabove for preparing retrocortin, but using as stating material, instead of the 3,11,20-triketo-17$\alpha$-hydroxy-21-acetoxy-pregnane used in that procedure, the known compound 9$\alpha$-fluoro-3,11,20-triketo-17$\alpha$-hydroxy-21-acetoxy-pregnane.

*Example 4*

$\Delta^{1,4}$-9$\alpha$-fluoro-3,20-diketo-11$\beta$,17$\alpha$-dihydroxy-pregnadiene 21-aldehyde is prepared utilizing the procedure of Example 2, but using $\Delta^{1,4}$-9$\alpha$-fluoro-3,20-diketo-11$\beta$,17$\alpha$,21-trihydroxy-pregnadiene as the starting material in place of the hydro-retrocortin utilized in Example 2.

The $\Delta^{1,4}$-9$\alpha$-fluoro-3,20-diketo-11$\beta$,17$\alpha$,21-trihydroxy-pregnadiene used as starting material in this example may be prepared in accordance with the procedure described hereinabove for preparing hydro-retrocortin, but using as starting material, instead of the retrocortin used in that procedure, the 9-fluoro-retrocortin prepared hereinabove.

Various changes and modifications may be made in carrying out the present invention without departing from the spirit and scope thereof. Insofar as these changes and modifications are within the purview of the annexed claims, they are to be considered as part of this invention.

I claim:

1. The process which comprises reacting $\Delta^{1,4}$-3,20-diketo-9-(Y)-11-(R)-17$\alpha$,21-dihydroxy-pregnadiene wherein Y is a radical selected from the group consisting of hydrogen and halo radicals, and R is a radical selected from the group consisting of keto and hydroxy, with cupric acetate to produce the corresponding $\Delta^{1,4}$-3,20-diketo-9-(Y)-11-(R)-17$\alpha$-hydroxy-pregnadiene 21-aldehyde.

2. The process which comprises reacting $\Delta^{1,4}$-3,11,20-triketo-17α,21-dihydroxy-pregnadiene with cupric acetate in a liquid medium comprising a polar solvent to produce $\Delta^{1,4}$-3,11,20-triketo-17α-hydroxy-pregnadiene 21-aldehyde.

3. The process which comprises reacting $\Delta^{1,4}$-3,20-diketo-11β,17α,21-trihydroxy-pregnadiene with cupric acetate in a liquid medium comprising a polar solvent to produce $\Delta^{1,4}$-3,20-diketo-11β,17α-dihydroxy-pregnadiene 21-aldehyde.

4. The process which comprises reacting 9-halo-$\Delta^{1,4}$-3,11,20-triketo-17α,21-dihydroxy-pregnadiene with cupric acetate in a liquid medium comprising a polar solvent to produce 9-halo-$\Delta^{1,4}$-3,11,20-triketo-17α-hydroxy-pregnadiene 21-aldehyde.

5. The process which comprises reacting 9-fluoro-$\Delta^{1,4}$-3,11,20-triketo-17α,21-dihydroxy-pregnadiene with cupric acetate in a liquid medium comprising a polar solvent to produce 9-fluoro-$\Delta^{1,4}$-3,11,20-triketo-17α-hydroxy-pregnadiene 21-aldehyde.

6. The process which comprises reacting 9-halo-$\Delta^{1,4}$-3,20-diketo-11β,17α,21-trihydroxy-pregnadiene with cupric acetate in a liquid medium comprising a polar solvent to produce 9-halo-$\Delta^{1,4}$-3,20-diketo-11β,17α-dihydroxy-pregnadiene 21-aldehyde.

7. The process which comprises reacting 9-fluoro-$\Delta^{1,4}$-3,20-diketo-11β,17α,21-trihydroxy-pregnadiene with cupric acetate in a liquid medium comprising a polar solvent to produce 9-fluoro-$\Delta^{1,4}$-3,20-diketo-11β,17α-dihydroxy-pregnadiene 21-aldehyde.

8. A $\Delta^{1,4}$-3,20-diketo-9-(Y)-11-(R)-17α-hydroxy-pregnadiene 21-aldehyde wherein Y is selected from the group consisting of hydrogen and halo radicals, and R is selected from the group consisting of hydroxy and keto radicals.

9. 1,4-pregnadiene-17α-ol-3,20-dione-21-al of the formula:

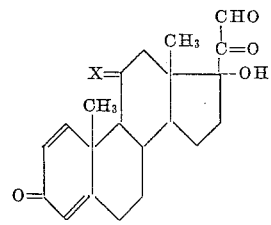

wherein X is a member selected from the group consisting of

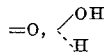

10. $\Delta^{1,4}$-3,11,20-triketo-17α-hydroxy-pregnadiene 21-aldehyde.

11. $\Delta^{1,4}$-3,20-diketo-11β,17α-dihydroxy-pregnadiene 21-aldehyde.

12. 9 - halo - $\Delta^{1,4}$ - 3,11,20 - triketo - 17α - hydroxy-pregnadiene 21-aldehyde.

13. 9 - fluoro - $\Delta^{1,4}$ - 3,11,20 - triketo - 17α - hydroxy-pregnadiene 21-aldehyde.

14. 9 - halo - $\Delta^{1,4}$ - 3,20 - diketo - 11β,17α - dihydroxy-pregnadiene 21-aldehyde.

15. 9 - fluoro - $\Delta^{1,4}$ - 3,20 - diketo - 11β,17α - dihydroxy-pregnadiene 21-aldehyde.

References Cited in the file of this patent

UNITED STATES PATENTS

| | | |
|---|---|---|
| 2,579,479 | Djerassi | Dec. 25, 1951 |
| 2,773,077 | Conbere | Dec. 4, 1956 |
| 2,773,078 | Weijlard | Dec. 4, 1956 |

OTHER REFERENCES

Rogers: Jour. Am. Chem. Soc., 74, 2947 (1952).

Fried: Jour. Am. Chem. Soc., 75, 2273–74 (1953); 76, 1455 (1954).